United States Patent
Il

(10) Patent No.: US 6,604,544 B2
(45) Date of Patent: Aug. 12, 2003

(54) SAFETY VALVE OF TANK FOR STORING AND CARRYING OIL OR CHEMICAL SUBSTANCE

(75) Inventor: Joo Kwang Il, KimHae-Si (KR)

(73) Assignee: Tank Tech Co., Ltd., KimHae-Si (KR)

( * ) Notice: Subject to any disclaimer, the term of this patent is extended or adjusted under 35 U.S.C. 154(b) by 0 days.

(21) Appl. No.: 09/906,236

(22) Filed: Jul. 16, 2001

(65) Prior Publication Data

US 2003/0010385 A1 Jan. 16, 2003

(51) Int. Cl.[7] .................... F16K 17/168; F16K 17/19
(52) U.S. Cl. .................. 137/493.8; 137/533.27; 137/587
(58) Field of Search .............. 137/493.8, 587, 137/533.27

(56) References Cited

U.S. PATENT DOCUMENTS

| | | | | |
|---|---|---|---|---|
| 3,965,916 A | * | 6/1976 | Karas | 137/15.01 |
| 4,172,465 A | * | 10/1979 | Dashner | 137/533.27 |
| 4,760,863 A | * | 8/1988 | Broer | 137/493.8 |
| 5,511,575 A | * | 4/1996 | Andenmatten et al. | 137/202 |
| 5,873,384 A | * | 2/1999 | Pedersen et al. | 137/471 |

* cited by examiner

Primary Examiner—Stephen M. Hepperle
(74) Attorney, Agent, or Firm—Notaro & Michalos P.C.

(57) ABSTRACT

Disclosed is a safety valve installed in a tank of a vessel carrying oil or chemical substance to discharge supersaturated gas produced in the tank and to adjust an internal pressure to a normal level when a negative pressure is produced in the tank. The valve comprises a lower body; an upper body mounted onto the lower body; a valve stem extended from the upper body to the lower body; and a disc provided on the valve stem and positioned between the upper and lower body to shut out a communication between the upper and lower body. The disc has a groove on an underside thereof, with a protruded portion being formed along an edge of the disc, a Teflon bushing is interposed between the disc and the valve stem, and the disc has a large diameter than an internal diameter of the lower body. The upper body has a straighten portion on an internal lower edge thereof, the straighten portion is formed in such a manner that until the disc is raised to a maximum stroke the straighten portion is parallel with the disc, and a space is formed between a side of the disc and the straighten portion of the upper body.

5 Claims, 4 Drawing Sheets

SAFETY VALVE OF TANK FOR STORING AND CARRYING OIL OR CHEMICAL SUBSTANCE

BACKGROUND OF THE INVENTION

1. Field of the Invention

The present invention relates generally to a safety valve of a tank for storing and carrying oil or chemical substance, and more particularly to a safety valve installed in a tank of a vessel carrying oil or chemical substance to discharge supersaturated gas produced in the tank and to adjust an internal pressure to a normal level when a negative pressure is produced in the tank.

2. Description of the Related Art

A number of valves are registered as patents, and have been widely used. One example of such a valve is disclosed in U.S. Pat. No. 5,873,384 issued to Pedersen et al., in which a disc is fixed to a valve stem, and when the disc is raised, a free passage slot between a side of the disc and an inner side of the upper body is gradually decreased. Another example is disclosed in U.S. Pat. No. 5,060,688 issued to Sorensen, in which when a disc is raised, a free passage slot between a side of the disc and an inner side of the upper body is gradually increased.

According to the prior relief valve, because a small amount of the supersaturated gas in the tank is discharged at an early stage when the gas is discharged through the relief valve, the internal pressure of the relief valve is increased to a level higher than a discharged pressure of the gas, such that the safety of the tank cannot be secured.

Specifically, at an early stage when the supersaturated gas is discharged from the tank, the internal pressure of the relief valve is maintained at a level higher than the discharged pressure of the supersaturated gas. At a middle stage, the internal pressure of the relief valve is gradually decreased, so that the internal pressure is normally maintained. Therefore, the prior relief valve has no ideal construction. In addition, the valve is frequently adhered to a valve seat due to volatile steam and gas, chemical substance, salt or the like, such that the valve is not easily opened

SUMMARY OF THE INVENTION

Therefore, in order to solve the problems involved in the prior art, it is an object of the present invention to provide a safety valve of a tank for storing and carrying oil or chemical substance, in which at an early stage when a supersaturated gas is discharged from the tank, an internal pressure of the valve is no higher than a discharged pressure of the gas by discharging a lot of gas, thereby securing the safety, significantly reducing a hammering phenomenon, and preventing the adhesion of the valve-valve seat and the disc-lower body.

In order to achieve the above objects, according to one aspect of the present invention, there is provided a safety valve installed in a tank of a vessel carrying oil or chemical substance to discharge supersaturated gas produced in the tank and to adjust an internal pressure to a normal level when a negative pressure is produced in the tank; a lower body; an upper body mounted onto the lower body; a valve stem extended from the upper body to the lower body; and a disc provided on the valve stem and positioned between the upper and lower body to shut out a communication between the upper and lower body.

The disc has a groove on an underside thereof, with a protruded portion being formed along an edge of the disc, a Teflon (a trademark) bushing is interposed between the disc and the valve stem, and the disc has a large diameter than an internal diameter of the lower body. Teflon is a Dumont trademark for a low friction material of tetrafluoroethylene (TFE) polymer and/or fluorinated ethylene-propylene (FEP) resin.

The upper body has a straight portion on an internal lower edge thereof, the straight portion is formed in such a manner that until the disc is raised to a maximum stroke the portion is parallel with the disc, and a space is formed between a side of the disc and the straight portion of the upper body.

The upper body includes a valve stem lifting unit having a lug integrally formed on an external upper portion of the upper body, the lug coupled to a pair of supporting rods by a bolt, a lever inserted between the supporting rods and fixed by a pin 46a, an engaging member welded on an end of the lever, and a semicircular ring fixed to an inside of the engaging member.

When the valve is closed, a slanted flow path is formed between the protruded portion of the disc and a slanted surface of the lower body to smoothly discharge supersaturated gas.

The safety valve further comprises a vacuum valve including a disc adhered to a disc seat, a shaft 66 provided with a weight and the disc, and a knob engaged to an end of the shaft.

The disc has a slanted surface on an upper edge to assist the discharge of the gas.

BRIEF DESCRIPTION OF THE DRAWINGS

The above objects, other features and advantages of the present invention will become more apparent by the preferred embodiment described with reference to the accompanying drawings, in which.

DETAILED DESCRIPTION OF THE PREFERRED EMBODIMENT

Now, a safety valve according to a preferred embodiment of the present invention will be described in detail with reference to accompanying -drawings.

Figure 1:
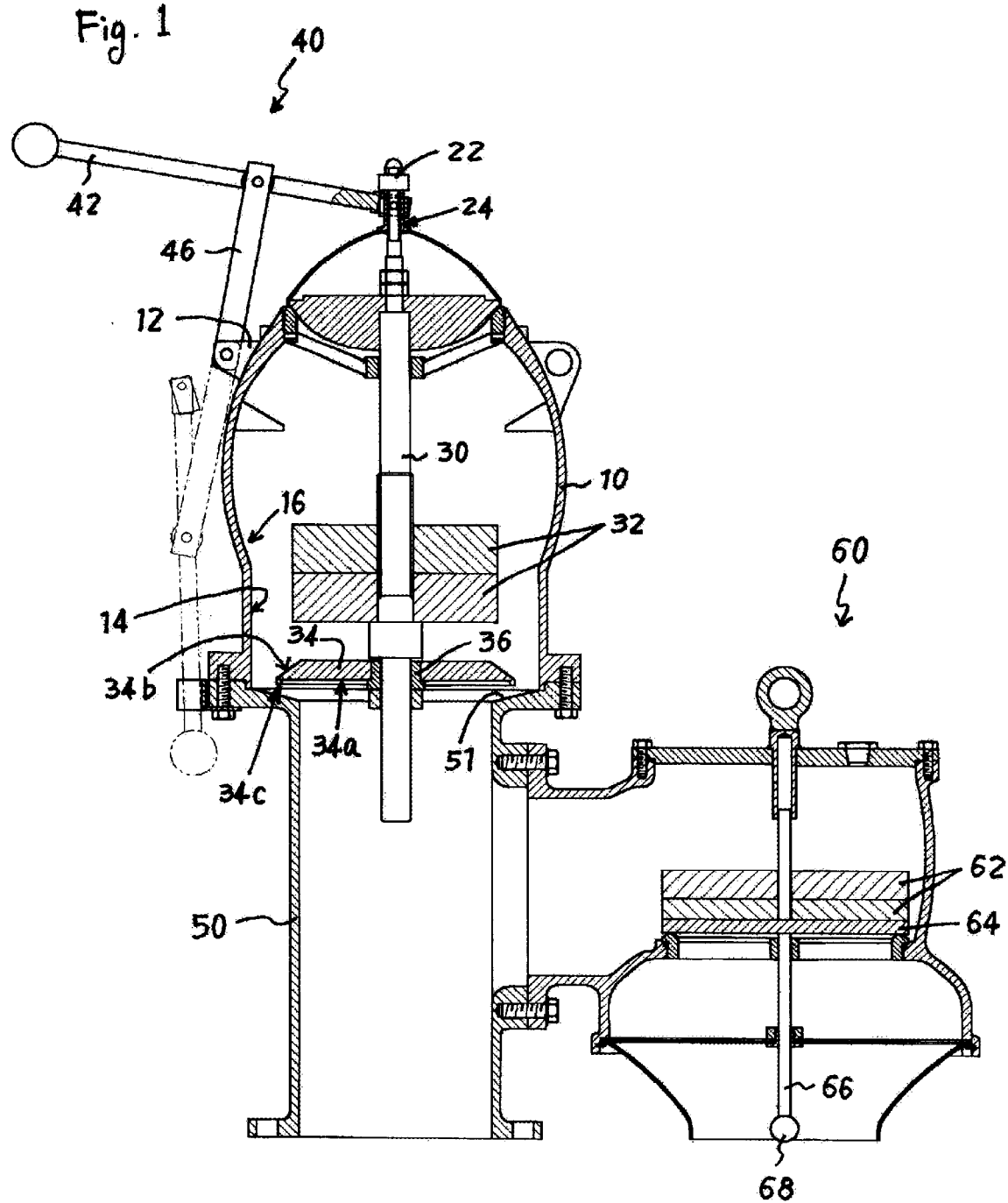
FIG. 1 is a cross sectional view illustrating the construction of the safety valve according to the present invention.

FIG. 1 is a cross sectional view illustrating the construction of the safety valve according to the present invention, in which a valve stem lifting unit 40 is mounted onto an upper body 10, and a disc 34 is positioned on the lowermost portion. Specifically, a slanted surface 34b is formed on an edge of an upper surface of the disc 34, so that a gas is more easily discharged. A Teflon or low friction material bushing 36 is integrally formed on a center of the disc 34. A groove 34a is formed on an underside of the disc 34, so that an edge of the underside of the disc forms a protruded portion. An underside of the bushing is contacted with a protruded upper surface of the lower body 50, and a gap is formed between an upper protruded portion 34c of the disc and a slanted surface 51 of the lower body 50.

With the above construction, if a supersaturated phenomenon of the gas occurs in the tank, the gas applies a pressure to the valve through the gap formed between the protruded portion 34c and the slanted surface 51 and a wide straight space formed between the side (a straight surface) of the disc and a straight portion 14 of the upper body. As the result, the valve is moved from the valve seat (i.e., the valve stem is raised), so that the gas is discharged to atmosphere, and simultaneously, a lot of discharged gas lifts the disc up. Specifically, at the moment that the supercharged gas opens the valve, the disc is not raised, but is maintained at its original position. The reason is that the valve stem is not integrally coupled to the disc, and the valve stem is inserted into the bushing. Therefore, the disc is moved up and down along the valve stem.

Figure 2:
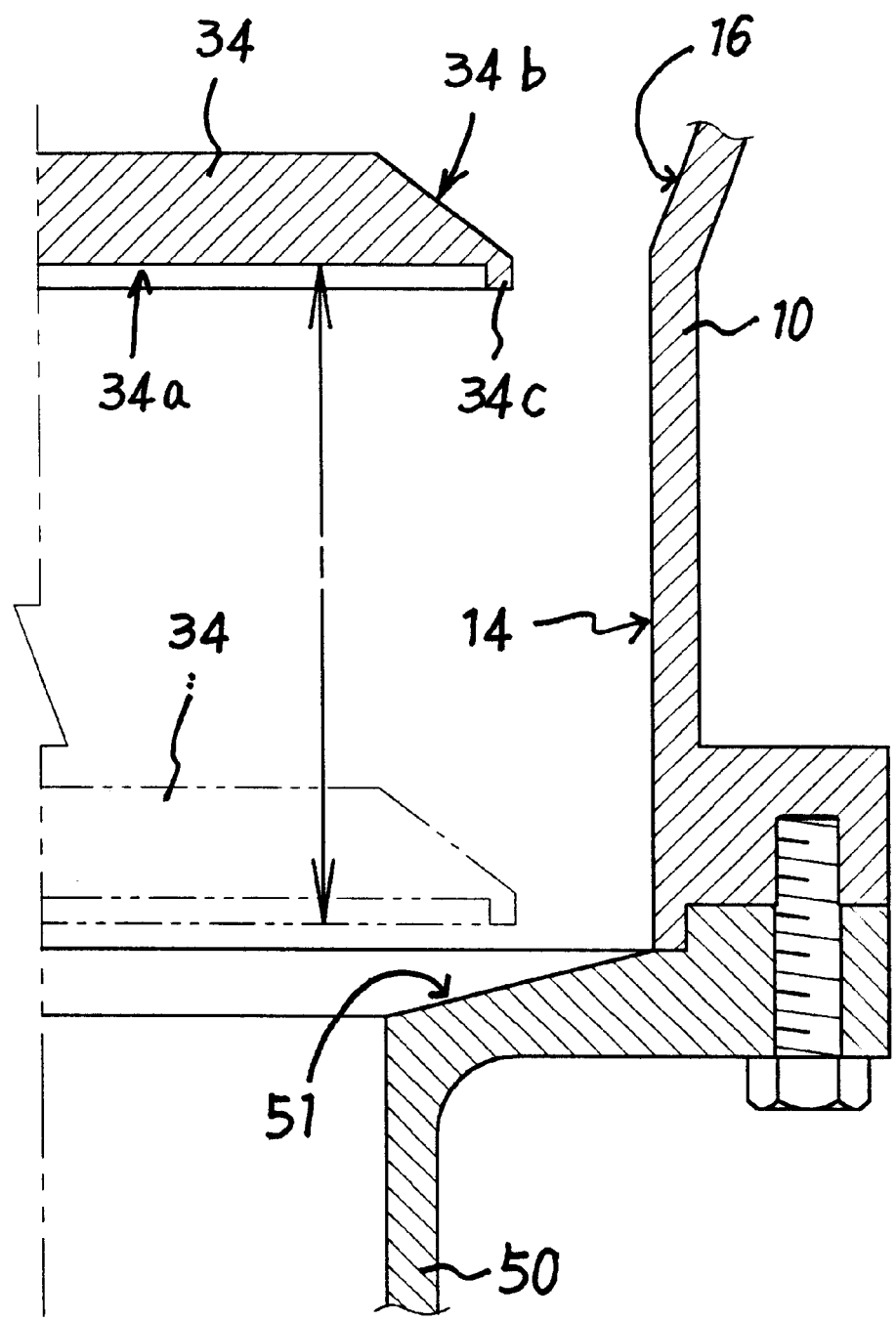
FIG. 2 is a cross sectional view illustrating the operation of a disc according to the present invention.

Again, if the disc is upwardly raised, the wide space (free passage slot) formed between the side of the disc and the straight portion 14 of the upper body is smoothly upwardly raised, with the parallel state between the disc and the straight portion being constantly maintained, as shown in FIG. 2.

And then, if the disc is completely raised, the valve is fully opened. At that time, it is noted that the interval between the side of the disc and the straight portion of the upper body is constantly maintained. In other words, because the wide space is formed between the disc and the straight portion 14 of the upper body as shown in the figures, a lot of gas can be smoothly discharged from at early stage.

At that time, the groove 34a and the protruded portion of the disc allow the resistance of the disc to be increased in response to the discharged pressure of a lot of gas. Another factor related with the smooth discharge of a lot of gas is the reason why the disc is provided on its upper edge with the slanted surface 34. In other words, the slanted surface 34b of the disc may minimize the interference (interruption) when a lot of gas is discharged.

Meanwhile, the space formed between the side of the disc and the straight portion 14 of the upper body is a few times or several tens times as large as the gap formed between the protruded portion 34c of the underside of the disc and the slanted surface 51 of the lower body. The dimension of the space formed between the side of the disc and the straight portion 14 of the upper body may be determined depending upon the capacitance of the tank and a pipe line.

Figure 4:
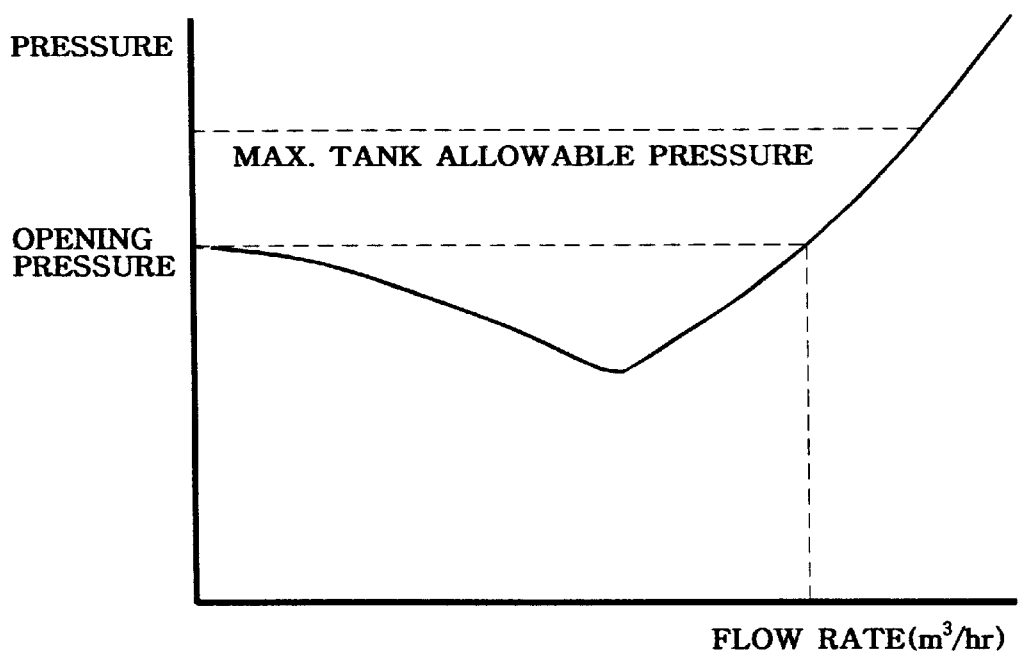
FIG. 4 is a graph showing the relationship of opening pressure and flow rate.

Because at early stage the pressure acting in the valve is no higher than the discharged pressure of the gas, safety can be secured, and the hammering phenomenon disappears. The operation results of the safety valve according to the present invention is shown in FIG. 4. Referring to FIG. 4, because at early stage the pressure acting in the valve is no higher than the discharged pressure of the gas, the safety can be secured, and the hammering phenomenon can be prevented.

Meanwhile, the gap formed between the protruded portion 34c of the underside of the disc and the slanted surface 51 of the lower body causes the moisture produced by the steam to be easily dropped in the tank to prevent the condensation phenomenon of the steam, thereby preventing the adhesion of the disc and the lower body. It is noted that the disc is made to have a larger diameter than an inner diameter of the lower body.

Figure 3:
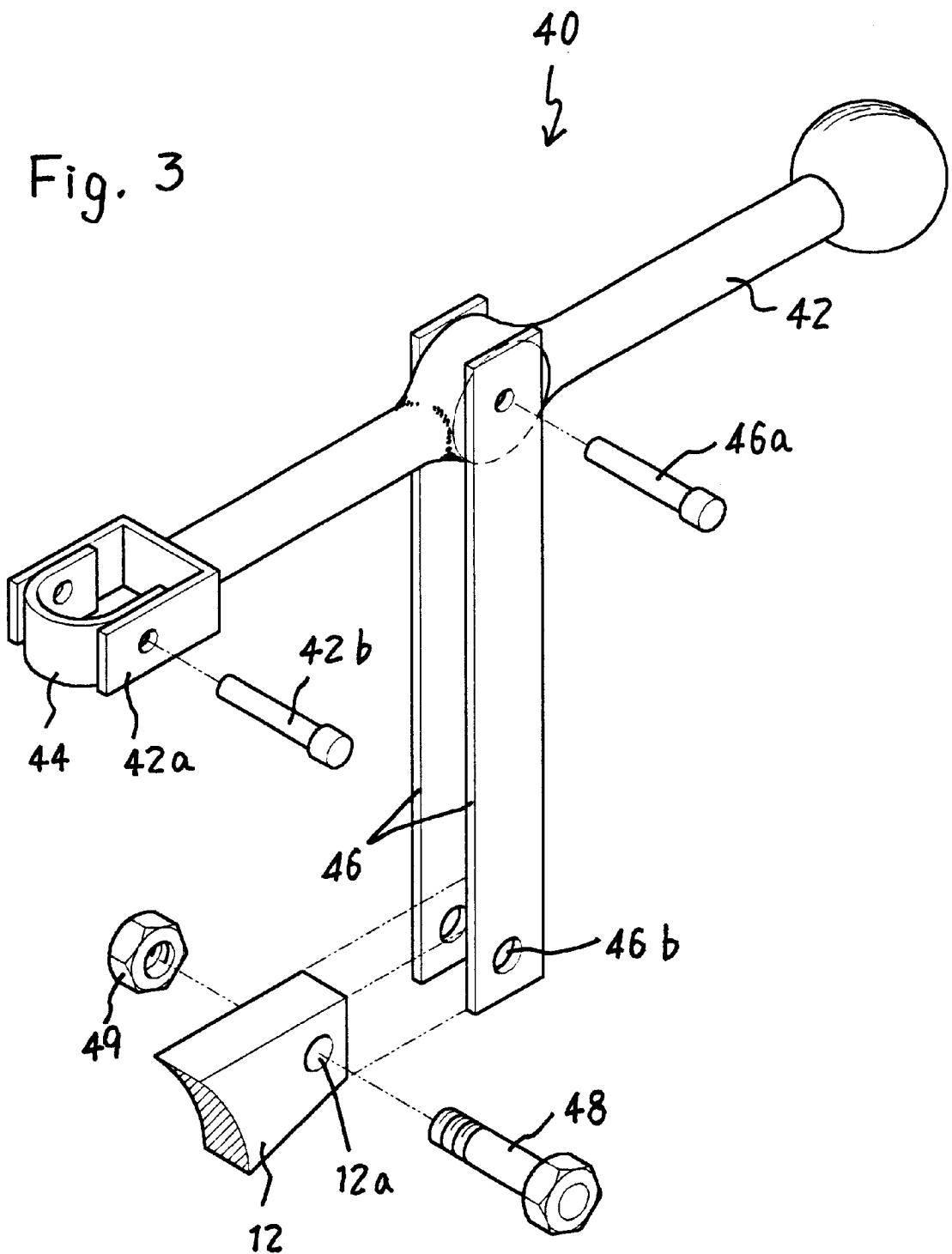
FIG. 3 is a perspective view illustrating the construction of the valve stem lifting unit according to the present invention.

The safety valve further comprises, as shown in FIG. 3, a valve stem lifting unit 40 to prevent the adhesion of the valve and the valve seat. A separate lug 12 is integrally formed on an external upper portion of the upper body, and has a hole 12a. The lug is coupled to a pair of supporting rods 46 by inserting a bolt 48 into the hole 12a of the lug and a hole 46b of the supporting rod and fastening the bolt with a nut 49.

A lever 42 is inserted between the supporting rods 46, and is fixed by a pin 46a. An engaging member 42a is welded on an end of the lever. A semicircular ring 44 is fixed to the inside of the engaging member by a pin 42b. The ring 44 can rotate around the pin 42b. After the ring 44 is inserted into a groove of the bushing 24 coupled to a threaded portion formed on an upper portion of the valve stem, a cap nut 22 is threaded into the threaded portion of the valve stem. The assembly of the valve stem lifting unit is completed by the above process.

With the construction, if the lever is pulled down, the valve stem is forcefully raised by a maximum stroke. Accordingly, the supersaturated gas produced in the tank is smoothly discharged.

Meanwhile, as shown in FIG. 1, a new vacuum valve 60 may be used. There is a problem in the vacuum valve in that a disc 64 is adhered to a disc seat. In order to solve the problem, a shaft 66 on which a weight 62 and the disc 64 are assembled is extended to m a sufficient length, so that a knob 68 engaged to an end of the shaft 66 is upwardly movable at any time. Accordingly, the disc is separated from the disc seat, thereby preventing the adhesion. The extended length of the shaft 66 may be different depending upon a size of the valve, while has to be selected to allow the operator to handle the shaft easily.

Although a preferred embodiment has been described, many modifications and variations may be made thereto in the light of the above teachings. It therefore may be practiced otherwise than as specifically described.

What is claimed is:

1. A safety valve installed in a tank of a vessel carrying oil or chemical substance to discharge supersaturated gas produced in the tank and to adjust an internal pressure to a normal level when a negative pressure is produced in the tank; comprising:

a lower body;

an upper body mounted onto the lower body;

a valve stem extended from the upper body to the lower body; and a disc provided on the valve stem and positioned between the upper and lower body to shut out a communication between the upper and lower body;

wherein the disc has a groove on an underside thereof, with a protruded portion being formed along an edge of the disc, a low friction material bushing is interposed between the disc and the valve stem, and the disc has a large diameter than an internal diameter of the lower body; and wherein the upper body has a straight portion on an internal lower edge thereof, the straight portion is formed in such a manner that until the disc is raised to a maximum stroke the straight portion is parallel with the disc, and a space is formed between a side of the disc and the straight straighten portion of the upper body.

2. The safety valve as claimed in claim 1, wherein the upper body includes a valve stem lifting unit having a lug integrally formed on an external upper portion of the upper body, the lug coupled to a pair of supporting rods by a bolt, a lever inserted between the supporting rods and fixed by a pin, an engaging member welded on an end of the lever, and a semicircular ring fixed to an inside of the engaging member.

3. The safety valve as claimed in claim 1, wherein when the valve is closed, a slanted flow path is formed between the protruded portion of the disc and a slanted surface of the lower body to smoothly discharge supersaturated gas.

4. The safety valve as claimed in claim 1, further comprising a vacuum valve including a further disc adhered to a disc seat, a shaft provided with a weight and the further disc, and a knob engaged to an end of the shaft.

5. The safety valve as claimed in claim 1, wherein the disc has a slanted surface on an upper edge to assist the discharge of the gas.

* * * * *